(12) United States Patent
     Ogle et al.

(10) Patent No.: US 9,380,336 B2
(45) Date of Patent: Jun. 28, 2016

(54) SET-TOP BOX WITH ENHANCED CONTENT AND SYSTEM AND METHOD FOR USE OF SAME

(71) Applicant: Enseo, Inc., Richardson, TX (US)

(72) Inventors: Vanessa Ogle, Fairview, TX (US); Edward H. Wolfe, Plano, TX (US)

(73) Assignee: Enseo, Inc., Richardson, TX (US)

( * ) Notice: Subject to any disclaimer, the term of this patent is extended or adjusted under 35 U.S.C. 154(b) by 0 days.

(21) Appl. No.: 15/002,223

(22) Filed: Jan. 20, 2016

(65) Prior Publication Data

US 2016/0142765 A1    May 19, 2016

Related U.S. Application Data

(63) Continuation-in-part of application No. 14/177,876, filed on Feb. 11, 2014, now Pat. No. 8,875,195, which is a continuation of application No. 13/528,663, filed on Jun. 20, 2012, now Pat. No. 8,650,600.

(60) Provisional application No. 62/105,246, filed on Jan. 20, 2015, provisional application No. 62/105,259, filed on Jan. 20, 2015, provisional application No. 61/498,734, filed on Jun. 20, 2011.

(51) Int. Cl.
    | | |
    |---|---|
    | *H04N 7/18* | (2006.01) |
    | *H04N 21/4363* | (2011.01) |
    | *H04N 21/41* | (2011.01) |
    | *H04N 21/422* | (2011.01) |
    | *H04N 21/214* | (2011.01) |

(52) U.S. Cl.
    CPC ..... *H04N 21/43637* (2013.01); *H04N 21/2143* (2013.01); *H04N 21/4131* (2013.01); *H04N 21/42203* (2013.01); *H04N 21/42221* (2013.01); *H04N 21/42224* (2013.01)

(58) Field of Classification Search
    CPC .............. H04N 21/43637; H04N 21/4131; H04N 21/42203; H04N 21/42224; H04N 21/42221; H04N 21/2143
    See application file for complete search history.

(56) References Cited

U.S. PATENT DOCUMENTS

| | | | |
|---|---|---|---|
| 6,263,503 B1 * | 7/2001 | Margulis | H04L 12/2812 348/E5.093 |
| 6,741,684 B2 | 5/2004 | Kaars | |
| 7,109,974 B2 * | 9/2006 | Kempisty | H04N 5/4403 345/173 |
| 8,286,204 B2 * | 10/2012 | Fukuda | G08C 23/04 348/734 |
| 8,650,600 B2 | 2/2014 | Ogle et al. | |
| 8,875,195 B2 | 10/2014 | Ogle et al. | |
| 2002/0059621 A1 * | 5/2002 | Thomas | G06F 3/0481 725/87 |

(Continued)

*Primary Examiner* — Oschta Montoya
(74) *Attorney, Agent, or Firm* — Scott T. Griggs; Griggs Bergen LLP

(57) ABSTRACT

A set-top box with enhanced content and system and method for use of the same are disclosed. In one embodiment, a wireless transceiver is located within a housing, which also interconnectively includes a television input, television output, a processor, and memory. The set-top box may establish a pairing with a proximate wireless-enabled interactive programmable device having a display. Content, such as the Internet, movies, music, or games, for example, may be imported from the programmable device and reformatted at the set-top box for display on a television via the television output, thereby creating an experience on the television parallel to the experience on the programmable device. Virtual remote control functionality may then be provided by a spoken sequence of words.

19 Claims, 5 Drawing Sheets

(56) References Cited

U.S. PATENT DOCUMENTS

| | | | |
|---|---|---|---|
| 2002/0143805 A1* | 10/2002 | Hayes | G06F 1/1626 345/169 |
| 2003/0073411 A1* | 4/2003 | Meade, II | G06F 1/1613 455/70 |
| 2005/0005297 A1* | 1/2005 | Lee | H04H 40/90 725/81 |
| 2005/0035846 A1* | 2/2005 | Zigmond | G08C 17/02 340/5.22 |
| 2005/0097618 A1* | 5/2005 | Arling | H04L 12/2805 725/114 |
| 2005/0108751 A1 | 5/2005 | Dacosta | |
| 2005/0262535 A1* | 11/2005 | Uchida | H04N 7/163 725/80 |
| 2010/0082485 A1 | 4/2010 | Lin et al. | |
| 2010/0082491 A1 | 4/2010 | Rosenblatt et al. | |
| 2010/0188279 A1 | 7/2010 | Shamilian et al. | |
| 2011/0007018 A1 | 1/2011 | McKinley et al. | |
| 2011/0067059 A1 | 3/2011 | Johnston et al. | |

* cited by examiner

SET-TOP BOX WITH ENHANCED CONTENT AND SYSTEM AND METHOD FOR USE OF SAME

PRIORITY STATEMENT & CROSS-REFERENCE TO RELATED APPLICATIONS

This application claims priority from (1) U.S. Application Ser. No. 62/105,246, entitled "Set-Top Box with Enhanced Content and System and Method for Use of Same" and filed on Jan. 20, 2015 in the names of Vanessa Ogle and Edward H. Wolfe; and (2) U.S. Application Ser. No. 62/105,259, entitled "Hospitality Adaptive Program Guide" and filed on Jan. 20, 2015 in the names of Vanessa Ogle et al.; both of which are hereby incorporated by reference for all purposes.

This application is a continuation-in-part of U.S. application Ser. No. 14/177,876, entitled "Set Top/Back Box, System and Method for Providing a Remote Control Device" and filed on Feb. 11, 2014, in the names of Vanessa Ogle et al.; which is a continuation of U.S. application Ser. No. 13/528,663 entitled "Set Top/Back Box, System And Method For Providing A Remote Control Device" and filed on Jun. 20, 2012, in the names of Vanessa Ogle, et al., and issued on Feb. 11, 2014, as U.S. Pat. No. 8,650,600; which claims priority from U.S. Patent Application No. 61/498,734, entitled "Set Top/Back Box, System and Method for Providing a Remote Control Device" and filed on Jun. 20, 2011, in the names of Vanessa Ogle et al.; all of which are hereby incorporated by reference for all purposes.

TECHNICAL FIELD OF THE INVENTION

This invention relates, in general, to set-top boxes and, in particular, to set-top boxes with enhanced content and systems and methods for use of the same that address and enhance the content typically received from an external signal source and provided to a television.

BACKGROUND OF THE INVENTION

Without limiting the scope of the present invention, the background will be described in relation to televisions in the hospitality lodging industry, as an example. To many individuals, a television is more than just a display screen, rather it is a doorway to the world, both real and imaginary, and a way to experience new possibilities and discoveries. Consumers are demanding enhanced content in an easy-to-use platform. As a result of such consumer preferences, the quality of content and ease-of-use are frequent differentiators in determining the experience of guests staying in hospitality lodging establishments. Accordingly, there is a need for improved systems and methods for providing enhanced content in an easy-to-use platform in the hospitality lodging industry.

SUMMARY OF THE INVENTION

It would be advantageous to achieve a set-top box that would improve upon existing limitations in functionality. It would also be desirable to enable a computer-based electronics and software solution that would provide enhanced content in an easy-to-use platform in the hospitality lodging industry or in another environment. To better address one or more of these concerns, a set-top box with enhanced content and system and method for use of the same are disclosed. In one embodiment of the set-top box, a wireless transceiver is located within a housing, which also interconnectively includes a television input, television output, a processor, and memory.

The set-top box may establish a pairing with a proximate wireless-enabled interactive programmable device having a display. Content, such as the Internet, movies, music, or games, for example, may be imported, e.g., streamed, from the programmable device and reformatted at the set-top box for display on a television via the television output, thereby creating an experience on the television parallel to the experience on the programmable device. Virtual remote control functionality may then be provided by a spoken sequence of words to send a command signal to a television, import content from the proximate wireless-enabled interactive programmable device to the television, or control an amenity associated with a user's stay in a lodging establishment, for example. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
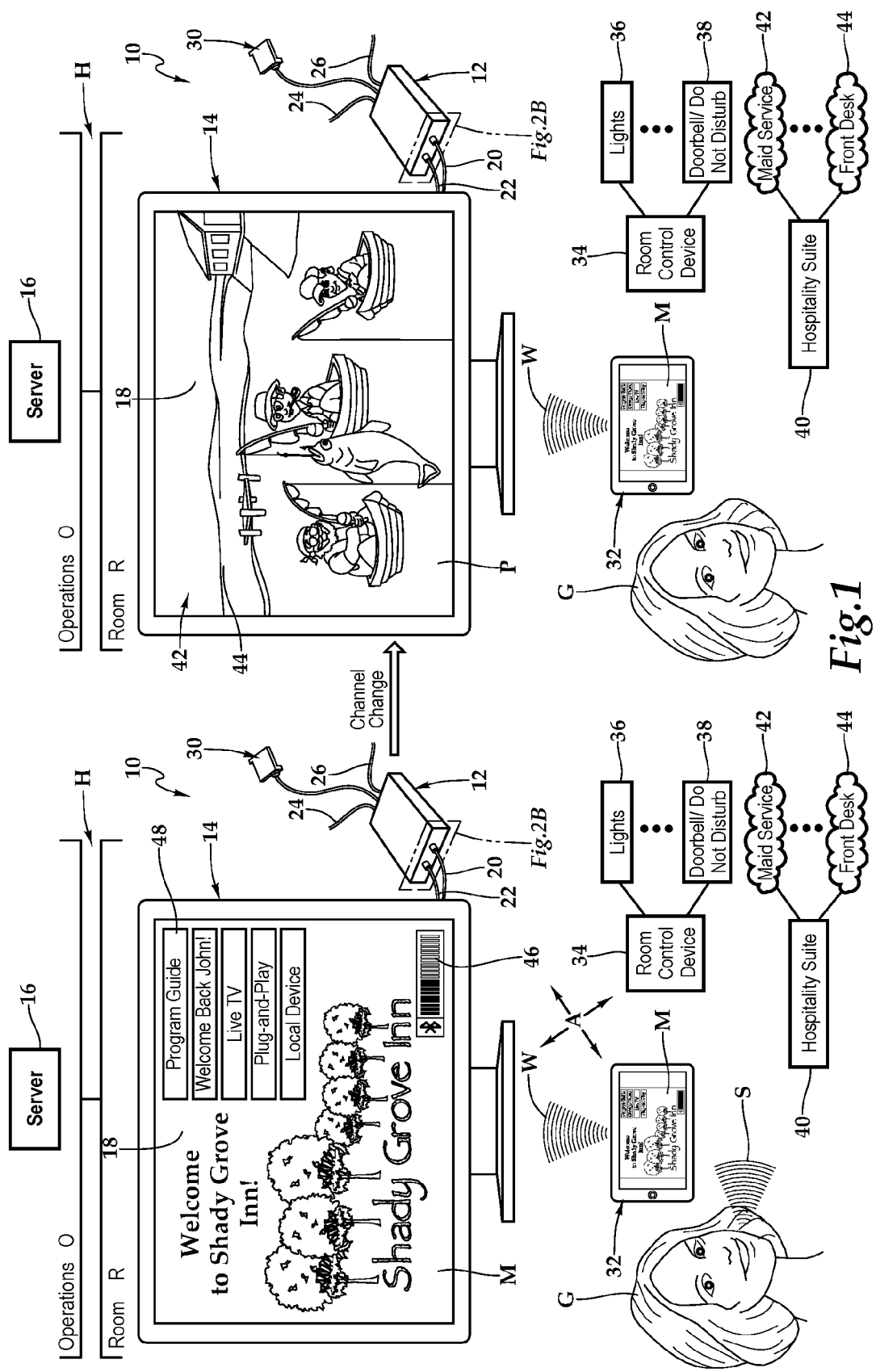
FIG. 1 is schematic diagram depicting one embodiment of a system for providing a set-top box having enhanced content thereon according to the teachings presented herein.
Figure 2A:
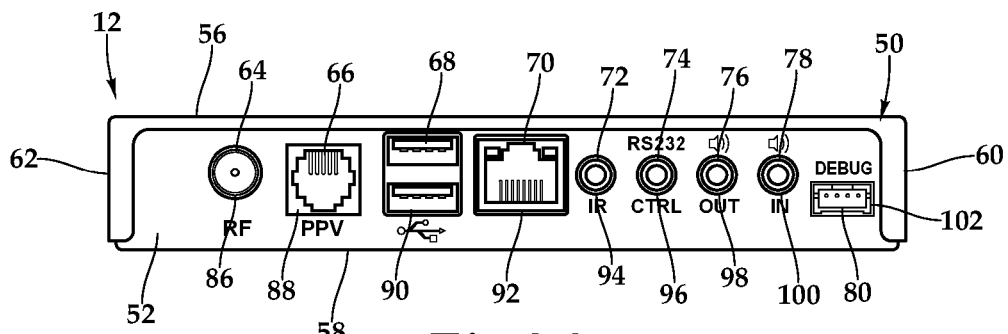
FIG. 2A is a wall-facing exterior elevation view of one embodiment of the set-top box depicted in FIG. 1 in further detail.
Figure 2B:
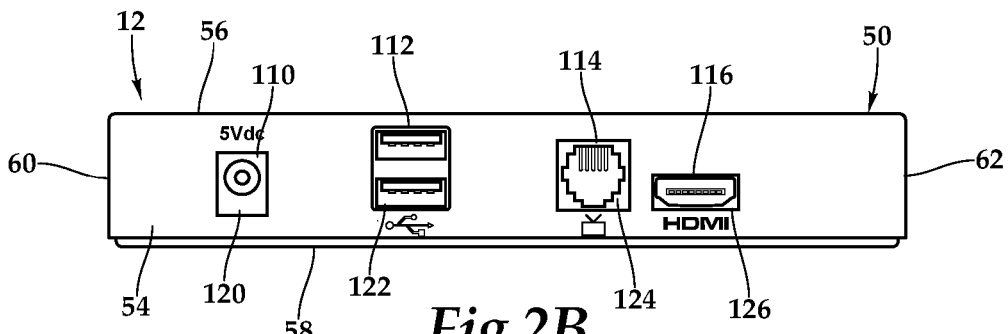
FIG. 2B is a television-facing exterior elevation view of the set-top box depicted in FIG. 2A.
Figure 2C:
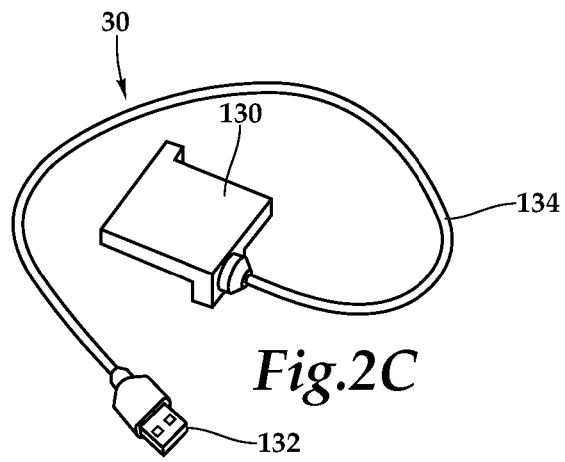
FIG. 2C is a front perspective view of a dongle depicted in FIG. 1 in further detail.
Figure 3:
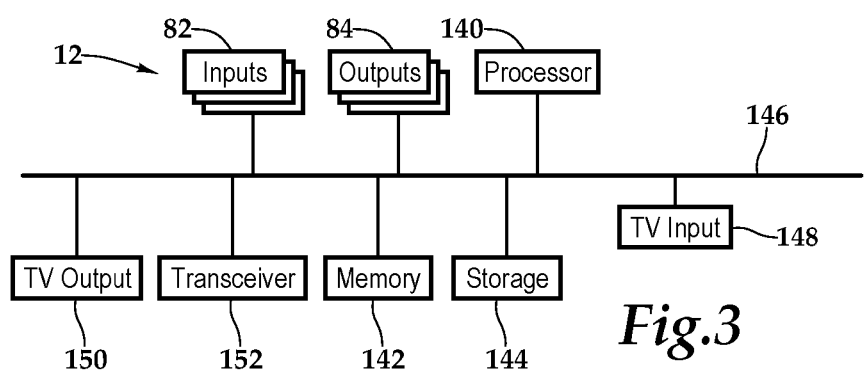
FIG. 3 is a functional block diagram depicting one embodiment of the set-top box presented in FIGS. 2A and 2B.

Referring initially to FIG. 1, therein is depicted one embodiment of a system 10 utilizing set-top box 12 with enhanced content capabilities being employed within a hospitality lodging establishment. The hospitality lodging establishment or, more generally, hospitality property, may be a furnished multi-family residence, dormitory, lodging establishment, hotel, hospital, or other multi-unit environment. As shown, by way of example and not by way of limitation, the hospitality environment is depicted as the hotel H having various rooms, including room R and back of the house operations O. The set-top box 12 is communicatively disposed with various amenities associated with the hospitality environment or hotel H, including a television 14. Set-top boxes, like the set-top box 12, may be deployed throughout the rooms R of the hotel H and are in communication with a property server 16, which is co-located at the hotel H.

As shown, in one embodiment, within the room R, the system 10 includes the set-top box 12 and a display illustrated as the television 14 having a screen 18. A connection, which is depicted as an HDMI connection 20, connects the set-top box 12 to the television 14. Other connections include a power cable 22 coupling the set-top box 12 to a power source, a coaxial cable 24 coupling the set-top box 12 to an external cable source, and a category five (Cat 5) cable 26 coupling the set-top box 12 to an external pay-per-view source at a hotel or other lodging establishment, for example. As shown, the set-top box 12 may include a dongle 30 providing particular technology and functionality extensions thereto. That is, the set-top box 12 may be set-top box-dongle combination in one embodiment. More generally, it should be appreciated that the cabling connected to the set-top box 12 will depend on the environment and application and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the television 14.

A proximate wireless-enabled interactive programmable device 32 may be a wireless-enabled interactive handheld device that may be supplied or carried by the guest and may be selected from a range of existing devices, such as, for example iPads®, iPhones®, iPod Touch®, Android® devices, Blackberry® devices, personal computers, laptops, tablet computers, smart phones, and smart watches, for example. As will be discussed in further detail below, in one implementation, an application installed from a server enables the set-top box 12 and the proximate wireless-enabled interactive programmable device 32 to be wirelessly paired. In another embodiment, a challenge-response is utilized to wirelessly pair the set-top box 12 and the proximate wireless-enabled interactive programmable device 32. A room control device 34 represents control of various amenities associated with a user's stay in a lodging establishment. The various amenities may include lights 36, a thermostat, shades, and a doorbell/do not disturb designation 38. The set-top box 12 is communicatively disposed with these various amenities, which may also include a CD/DVD player, a radio tuner, and a hospitality suite 40, which represents a set of services such as check in/check out, maid service 42, spa, room service, and front desk 44.

As shown, an interactive portal 48 is displayed on the display 18, which is generic, unless a guest configuration profile is loaded within the set-top box 12. The guest configuration profile may be loaded from the operations, e.g., the front desk or hotel headend, by use of a remote control, or by a proximate device, such as the proximate wireless-enabled interactive programmable device 32. In one implementation, as illustrated, the set-top box 12 extends a physical authorization interface, shown as area A, from the set-top box to an area easily accessible to transitory guest's convenience such as in front or side of the television 14. This physical authorization interface A may include a short range wireless data connection that is enabled only when very close physically to the proximate wireless-enabled interactive programmable device 32, for example. Further, once the pairing is established, as represented by bar 46, the set-top box 12 provides a secure wireless interface to communicate transitory guest user device authorization information to the set-top box 12 to accomplish verification. Once authorization information is communicated to the set-top box, the set-top box enables the guest configuration profile.

Enabled, the guest configuration profile provides a customized set-top box experience. More particularly, the guest configuration profile includes guest identification, a guest channel preference presentation, and a guest service preference presentation with guest account information. The guest configuration profile is a guest-specific, guest-customized set-top box generated environment referencing an explicit digital representation of a guest's identity. The set-top box generates the interactive portal 48 including a guest indication acknowledgement "Welcome Back John!", and various other menu options including a program guide, a guest channel preference presentation, a guest service preference presentation, a live television option, a plug-and-play option, and a local device option, which includes premium programming, game, and music content, for example. Further, personal area network and local area network connectivity is provided to the proximate wireless-enabled interactive programmable device 32, as shown by the Wifi indicator W.

In operation, virtual remote control functionality may be provided by the proximate wireless-enabled interactive programmable device 32 by a spoken sequence of words to send a command signal to the television, to import content from the proximate wireless-enabled interactive programmable device to the television, or control an amenity associated with a user's stay in a lodging establishment, for example. As shown in FIG. 1, by way of example, guest G speaks spoken words S which is received by the proximate wireless-enabled interactive programmable device 32 and translated into a command to change the channel from menu M to program P.

Referring to FIG. 2A, FIG. 2B, FIG. 2C, and FIG. 3, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes a housing 50 having a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an RF input 86, a RJ-45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ-coupling 124, and an HDMI port 126. It should be appreciated that the configuration of ports may vary with the set-top box depending on application and context. As previously alluded to, the housing 50 may include a housing-dongle combination including, with respect to the dongle 30, a unit 130 having a cable 134 with a set-top box connector 132 for selectively coupling with the set-top box 12.

Within the housing 50, a processor 140, memory 142, storage 144, the inputs 82, and the outputs 84 are interconnected by a bus architecture 146 within a mounting architecture. It should be understood that the processor 140, memory 142, storage 144, the inputs 82, and the outputs 84 may be entirely contained within the housing 50 or the housing-dongle combination. The processor 140 may process instructions for execution within the computing device, including instructions stored in the memory 142 or in storage 144. The memory 132 stores information within the computing device. In one implementation, the memory 132 is a volatile memory unit or units. In another implementation, the memory 142 is a non-volatile memory unit or units. Storage 144 provides capacity that is capable of providing mass storage for the set-top box 12. Various inputs 82 and outputs 84 provide connections to and from the computing device, wherein the inputs 82 are the signals or data received by the set-top box 12, and the outputs 84 are the signals or data sent from the set-top box 12.

A television content signal input 148 and a television output 150 are also secured in the housing 50 in order to receive content from a source in the hospitality property and forward the content, including external content such as cable and satellite and pay-per-view (PPV) programming, to the television located within the hotel room.

A transceiver 152 is associated with the set-top box 12 and communicatively disposed with the bus 146. As shown the transceiver 152 may be internal, external, or a combination thereof to the housing. Further, the transceiver 152 may be a transmitter/receiver, receiver, or an antenna for example. Communication between various amenities in the hotel room and the set-top box 12 may be enabled by a variety of wireless methodologies employed by the transceiver 152, including 802.11, 3G, 4G, Edge, WiFi, ZigBee, near field communications (NFC), Bluetooth low energy and Bluetooth, for example. Also, infrared (IR) may be utilized.

The memory 142 and storage 144 are accessible to the processor 140 and include processor-executable instructions that, when executed, cause the processor 140 to execute a series of operations. The processor-executable instructions specify a search operation to identify the proximate wireless-enabled interactive programmable device, wherein the search operation utilizes the wireless transceiver to wirelessly identify the proximate wireless-enabled interactive programmable device 32. The processor-executable instructions then establish a pairing between the proximate wireless-enabled interactive programmable device 32 and the set-top box 12. Following the establishment of a pairing, formatted parallel audiovisual experience instructions are sent to the proximate wireless-enabled interactive programmable device 32. The formatted parallel audiovisual experience instructions are configured to provide a downstream parallel experience related to the content on the television 14. The memory 142 also provides instructions to the processor for virtual buttons on a touch screen display associated with the proximate wireless-enabled interactive programmable device 32. The virtual buttons are associated with the proximate wireless-enabled interactive programmable device 32.

With respect to controlling the television 14, the processor-executable instructions cause the processor to receive and process virtual remote control functionality input instructions from the proximate wireless-enabled interactive programmable device 32. The virtual remote control functionality input instructions being representations of a spoken sequence of words. The processor 140 is then caused to evaluate the spoken sequence of words to assign a meaning to the spoken sequence of words and then generate a command signal, which is sent to the television. The formatted parallel audiovisual experience instructions include instructions that prompt the spoken sequence of words as a response.

With respect to importing content from the proximate wireless-enabled interactive programmable device 32, the memory 142 includes processor-executable instructions that, when executed cause the processor 140 to responsive to evaluating the spoken sequence of words, import content from the proximate wireless-enabled interactive programmable device 32 and reformat the imported content such that the television output forwards a fully tuned signal including the imported content to the television 14. The fully tuned signal includes the imported content provides an upstream parallel experience on the television 14 related to the content on the proximate wireless-enabled interactive programmable device 32.

With respect to amenity control, the memory 142 includes processor-executable instructions that, when executed cause the processor to be responsive to evaluating the spoken sequence of words, send a command to the particular amenity. A configuration profile is associated with the memory 142 and processor-executable instructions that enables the set-top box 12 to control multiple proximate amenities related to a user' stay in a lodging establishment in a multi-room environment, including the particular amenity to be controlled. The configuration profile, for each amenity of the plurality of amenities, includes instructions for virtual buttons on a touch screen display, and instructions for associating virtual remote control functionality input instructions from the touch screen display with commands. The configuration profile, for each amenity of the plurality of amenities, includes instructions for virtual buttons on a touch screen display, and instructions for associating virtual remote control functionality input instructions received as the spoken sequence of words from the proximate wireless-enabled interactive programmable device with commands.

Figure 4:
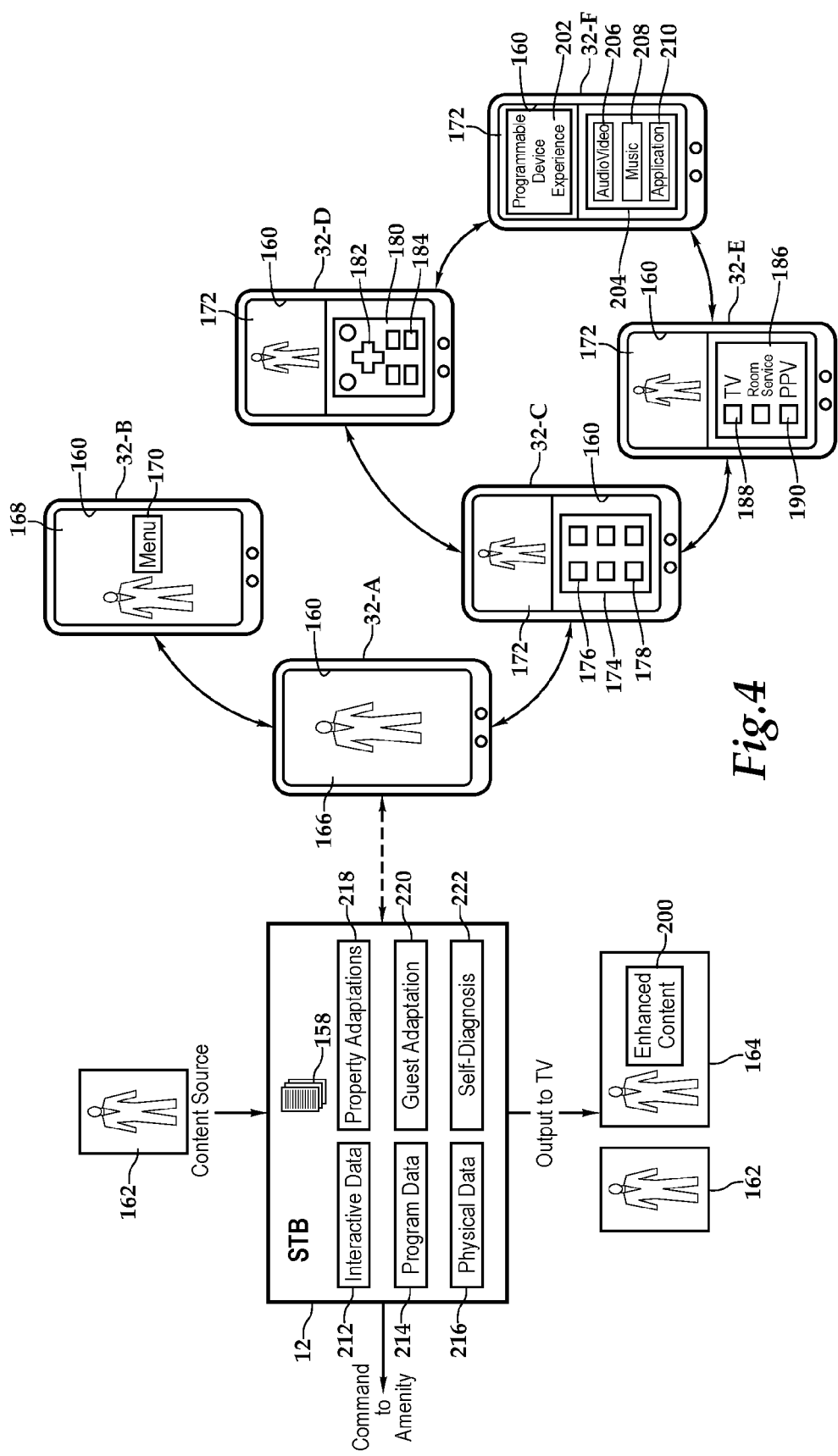
FIG. 4 is a schematic block diagram depicting one operational embodiment of the set-top box and a programmable device, both components of the system presented in FIG. 1.

Referring now to FIG. 4, the pairing between the set top box 12 and the proximate wireless-enabled interactive programmable device 32 having a touch screen display 160 is illustrated in further detail, wherein the alphabetical designations A-F used with proximate wireless-enabled interactive programmable device 32 indicate particular selectable configurations of the proximate wireless-enabled interactive programmable device 32, which are labeled proximate wireless-enabled interactive programmable device 32-A through 32-F. As shown, the set top box 12 receives content 162 from a source and outputs to the television either the content 162 or a modified version of the content 162, which is designated content 164. The modified designation of the content 164 may prompt the user to select between particular services and features offered, which may relate to the previously discussed amenities or hospitality suite services, for example.

The programmable device 32-A includes content 166 on a touch screen display 160, which corresponds to content 162 on the television 14. As will be discussed in further detail below, the content 166 is formatted and/or scaled for the touch screen display 160. The programmable device 32-B includes content 168, which is a formatted and/or scaled version of content 164, on the touch screen display 160. The content 168 includes a virtual button 170 that if pressed by a user or spoken by the user causes the corresponding functionality to the virtual button 170 to occur. More specifically, the set-top box 12 receives a virtual remote control functionality instruction from the programmable device 32-B, which indicates that on touch screen 160 coordinates ($X_{PD}, Y_{PD}$) a touch-and-click operation occurred. The set-top box 12 translates or de-scales the coordinates ($X_{PD}, Y_{PD}$) to coordinates ($X_{STB}, Y_{STB}$), which the set-top box 12 compares against a configuration profile 158 in order to determine that the actuation of the virtual button 170 presents a pay-per-view terminal guide listing. Alternatively, the set-top box 12 responds to a spoken command to accomplish the functionality. The set-top box 12 then sends a command signal to a PPV terminal, for example, and the requested guide is then displayed.

The programmable device 32-C includes content 172 on the touch screen display 160. The content 172 corresponds to the content 162, however, the content 172 is formatted and/or scaled for viewing on only an upper portion of the touch screen display 160. A virtual remote control 174 is displayed on the lower portion of the touch screen display 160. The virtual remote control 174 controls the CD/DVD player via virtual buttons, including virtual buttons 176, 178 or by the receiving of spoken words. Similar to the actuation of the virtual button 170 with programmable device 32-B, the set-top box 12 receives a virtual remote control functionality instruction, tactilely inputted or spoken, from the programmable device 32-C, which indicates that on touch screen display 160 coordinates ($X_{PD}, Y_{PD}$) a touch-and-click operation occurred. The set-top box 12 translates or de-scales the coordinates ($X_{PD}, Y_{PD}$) to coordinates ($X_{STB}, Y_{STB}$), which the set-top box 12 compares against the configuration profile 158 in order to determine that the actuation of the button 176 initiates playing music on a CD/DVD player. Alternatively, language model information is used to recognize words to facilitate the same command. The set-top box 12 then sends a command signal to the CD/DVD player and music is played. The programmable device 32-D having virtual remote control 180 for television 14 control with buttons 182, 184 and the programmable device 32-E for set-top box 12 control having virtual remote control 186 with buttons 188, 190 have similar functionality to the programmable device 32-B and 32-C.

With respect to providing a programmable device experience 200 on the television with the modified content 164, the programmable device 32-F includes a programmable device experience 202 that may provide the importation of content from the programmable device 32-F to the television. The programmable device 32-F includes buttons 206, 208, and 210 for the importation of audio, music or application content that have similar functionality to the programmable device 32-B and 32-D.

In one implementation, a user may toggle between the full screen television presentation of the programmable device 32-A and the split screen television/remote presentation of the proximate wireless-enabled interactive programmable devices 32-B through 32-F by selectively swiping or clicking a predetermined portion of the touch screen display 160. Once in the split screen television/remote presentation, the user may selectively switch between an array of virtual remote controls corresponding to the configuration profile in the set-top box 12, which correspond to the various amenities in the multi-unit environment such that a verbal command may be given to command the amenity.

With respect to the set-top box 12, data is collected about use, including interactive data 212, program data 214, and physical data 216. The interactive data 212 includes information about the non-television interactions of a guest with the set-top box 12. The program data 214 includes information about the television and content-based interactions of the guest with the set-top box 12. The physical data 216 includes information about the state data of the set-top box 12. This data provides for property adaptions 218, guest adaptions 220, and self-diagnosis 222, for example.

More specifically, collection of this data permits hotel guests to tailor their specific program guide and to store those preferences for future hotel stays by providing a means to learn a guest's preferences in a central database then store those preferences for future stays thus allowing the guest to reuse the preferences in future stays regardless of the television make and model in the hotel room. Stored television preferences can be stored and retrieved using two methods. First, in a hotel brand database and installed in a specific guest room based on loyalty program membership identifier. These preferences would be automatically provided to the set-top box 12 as the guest checks into the hotel or self-applied by the guest through registration in an internet based system accessible to guests during their hotel stay at any property so equipped.

Data is collected for an adaption program guide that allows guests to customize the interactive program guide at his or her set-top box 12 they are shown in a variety of ways including but not limited to:

Presentation of a sub-set of the items available in the interactive program guide such as only sports channels, a specific list of channels of interest to the specific guest, only over-the-top programming or any combination of these items. Items for display would be selectable either as discrete items available for yes/no election by the guest or through groups of like items or services that can be selected as a group for inclusion or elimination from the interactive program guide.

Presentation of the items in the interactive program guide in a specific order such as sports channels first followed by Over-The-Top Applications or any combination of items and services available in the system.

Changes in font size, background color or other graphical features as necessary to improve the system usability for individuals with accessibility challenges.

Individual guest settings are stored in a database of guest settings indexed by a master index record that could be either the guest's loyalty program membership identifier or a separate identifier such as the guests email address. In some situations, a hotelier may choose to use their own system to maintain these records while other hoteliers may choose to use a database system provided by an external service.

Guest specific adaptations to their specific room's interactive program guide can be applied through an automated means utilizing the hotel's property management system and its ability to store hotel loyalty membership information for a specific guest. The invention provides a means to retrieve a guest's interactive program guide adaptations they created at a previous hotel stay and automatically apply those settings to a current hotel stay by retrieving the guest's hotel loyalty membership number from the hotel property management system. Once the loyalty number is retrieved, the invention would use that number to look up, retrieve and then apply the guest's interactive program guide adaptations stored in the system from a previous stay.

Alternatively, some hoteliers may choose to use a completely separate and non-hotel brand specific database to manage guest specific adaptations to the interactive program guide. In this implementation, guests would log into the system in their room using the television system in any equipped hotel whereupon the system would download their specific customizations, which would immediately take effect on the television(s) in their rooms. Any customizations made while the guest was logged into the system are then recorded in the system database and available for future guest stays at any equipped hotel.

Guests personal adaptations would be recorded by either of two methods. These methods can be used independently or together to create and store a guest's personal adaptations.

Using the first method, guests would select from an on-screen presentation on the guest's television in their room, the channels and services they want to include in their customized interactive program guide. This presentation is constructed using a variety of graphical presentations that could include checkboxes, radio buttons, and check lists or other presentations. Guests would then accept the selected items for display on their television. If the guest was a hotel loyalty program member and the hotel has elected to use this feature, the guest's settings would be saved in a database associated with the guest's loyalty membership number. This is in addition to preserving the newly customized settings for the duration of the guest's current stay. If the hotel brand elects to use a brand independent database the guest's customizations would then be stored in that database using the guests login information as the record key.

Using the second method, the system would automatically prioritize channels and services based on guest channel usage. Prioritization would be based on multiple factors such as but not limited to:

Channels or services elected for viewing by the guest
Duration of viewing by the guest of particular channels or services
Associated channels and services similar to channels or services viewed by the guest based on selection or duration by the guest.

The system and method may provide a menu-driven environment which may duplicate content on the television, provide related content, furnish a parallel experience, or provide controls for the environment in the room. For example, with respect to the parallel experience, a channel guide may be provided. By way of another example, providing controls for the environment may include enabling the thermostat and lighting controls from the interactive device by way of the set-top box.

Thus, the systems and methods disclosed herein may enable users to use existing electronic devices as a temporary remote control device to control a television via a set-top box. Therefore the systems and methods presented herein avoid the need for additional or expensive high functionality remote controls. In this respect, the teachings presented herein also include providing the software and/or application for the electronic device or interactive handheld device. The application, to the extent needed, may be downloaded from the Internet or alternatively made available by download from the set-top box.

Figure 5:
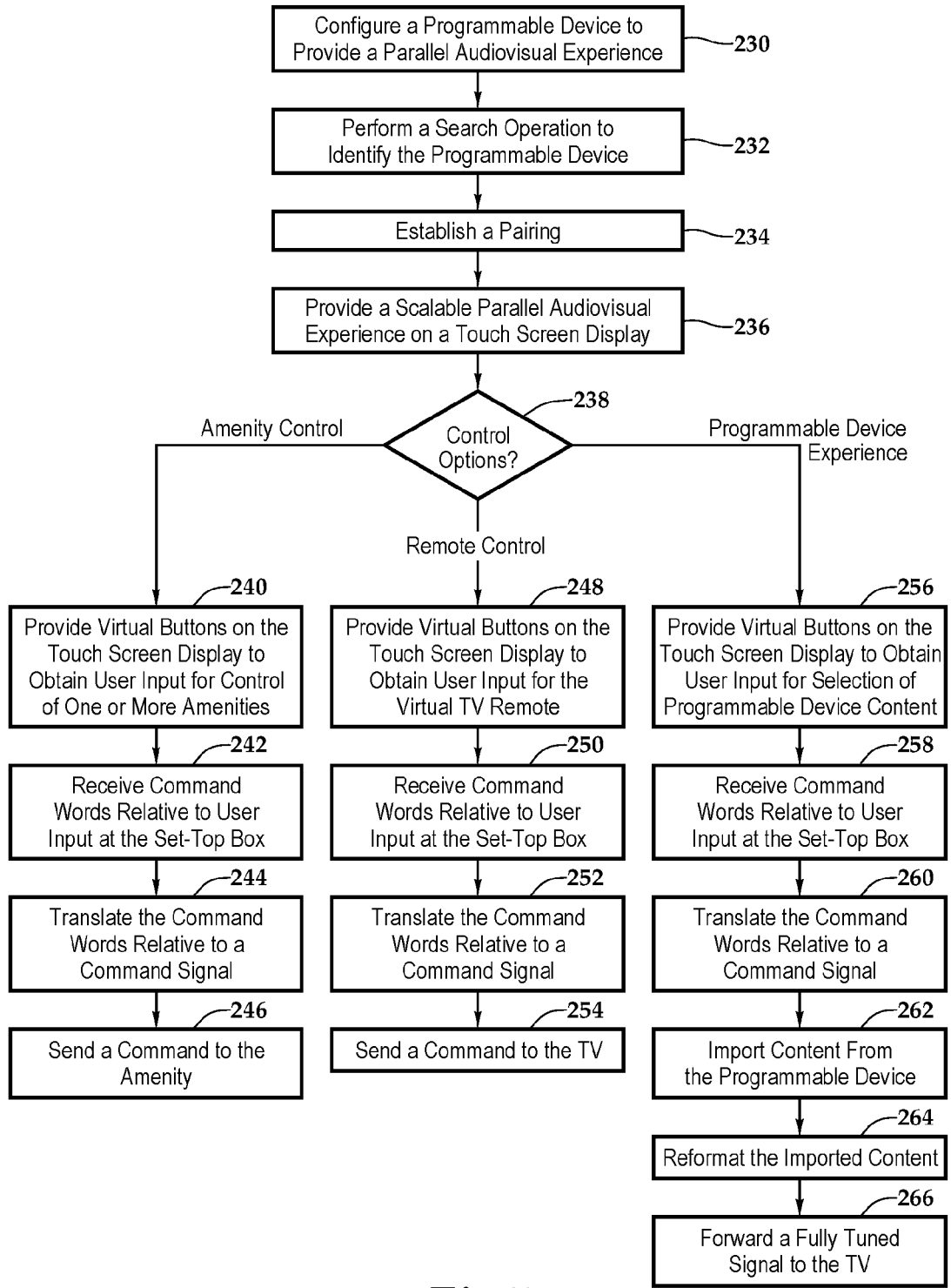
FIG. 5 is a flow chart depicting one embodiment of a method for providing a set-top box having enhanced content according to the teachings presented herein.

FIG. 5 depicts one embodiment of a method for providing a remote control device, according to the teachings presented herein. At block 230, the programmable device is configured to provide a parallel audiovisual experience. In one implementation, this may involve using an existing application on the programmable device, such as a browser, or downloading a new application. At block 232, a search, which may be active or passive, is performed by the set-top box to identify a physically proximate programmable device in the multi-room environment. At block 234, a pairing is established prior to a scalable parallel audiovisual experience being provided at block 236 on the touch screen display of the programmable device. The audiovisual experience is parallel to the television experience being provided by the set-top box. As noted by block 236, this experience may include providing virtual buttons integrated within the audiovisual experience or two or more panels within the touch screen display showing the television experience and one or more virtual remote controls.

Referring to decision block 238, as previously discussed, the virtual remote controls and buttons each correspond to amenities under the control of the set-top box, remote control of the television, or importing content from the proximate wireless-enabled interactive programmable device to the television. With respect to control of amenities, at block 240, instructions are provided from the set-top box for virtual buttons on a touch screen display associated with the proximate wireless-enabled interactive programmable device. The virtual buttons are associated with the proximate wireless-enabled interactive programmable device and relate to obtaining user input for the amenity control functionality provided by the set-top box. At block 242, the set-top box receives and processes amenity control functionality input instructions from the proximate wireless-enabled interactive programmable device. The amenity control functionality input instructions are representations of a spoken sequence of words. At block 244, the command words are translated into a command signal. More specifically, the spoken sequence of words is evaluated to assign a meaning to the spoken sequence of words and a command signal generated. At block 246, responsive to evaluating the spoken sequence of words, a command signal is sent to the particular amenity.

Returning to decision block 238, with respect to remote control of the television, at block 248, instructions are provided from the set-top box for virtual buttons on a touch screen display associated with the proximate wireless-enabled interactive programmable device. The virtual buttons are associated with the proximate wireless-enabled interactive programmable device and relate to obtaining user input for the virtual TV remote control functionality provided by the set-top box. At block 250, the set-top box receives and processes virtual remote control functionality input instructions from the proximate wireless-enabled interactive programmable device. The virtual remote control functionality input instructions are representations of a spoken sequence of words. At block 252, the command words are translated into a command signal. More specifically, the spoken sequence of words is evaluated to assign a meaning to the spoken sequence of words and a command signal generated. At block 254, the command signal is sent to the television.

Returning now to decision block 238 and the importation of content from the proximate wireless-enabled interactive programmable device, at block 256, instructions are provided from the set-top box for virtual buttons on a touch screen display associated with the proximate wireless-enabled interactive programmable device. The virtual buttons are associated with the proximate wireless-enabled interactive programmable device and relate to obtaining user input for the programmable device experience functionality provided by the set-top box. At block 258, the set-top box receives and processes virtual remote control functionality input instructions from the proximate wireless-enabled interactive programmable device. The virtual remote control functionality input instructions are representations of a spoken sequence of words. At block 260, the command words are translated into a command signal. More specifically, the spoken sequence of words is evaluated to assign a meaning to the spoken sequence of words and a command signal generated. At block 262, responsive to evaluating the spoken sequence of words, content is imported from the proximate wireless-enabled interactive programmable device. At block 264, imported content is reformatted such that the television output forwards a fully tuned signal including the imported content to the television at block 266. As discussed, the fully tuned signal including the imported content provides an upstream parallel experience on the television related to the content on the proximate wireless-enabled interactive programmable device.

Figure 6:
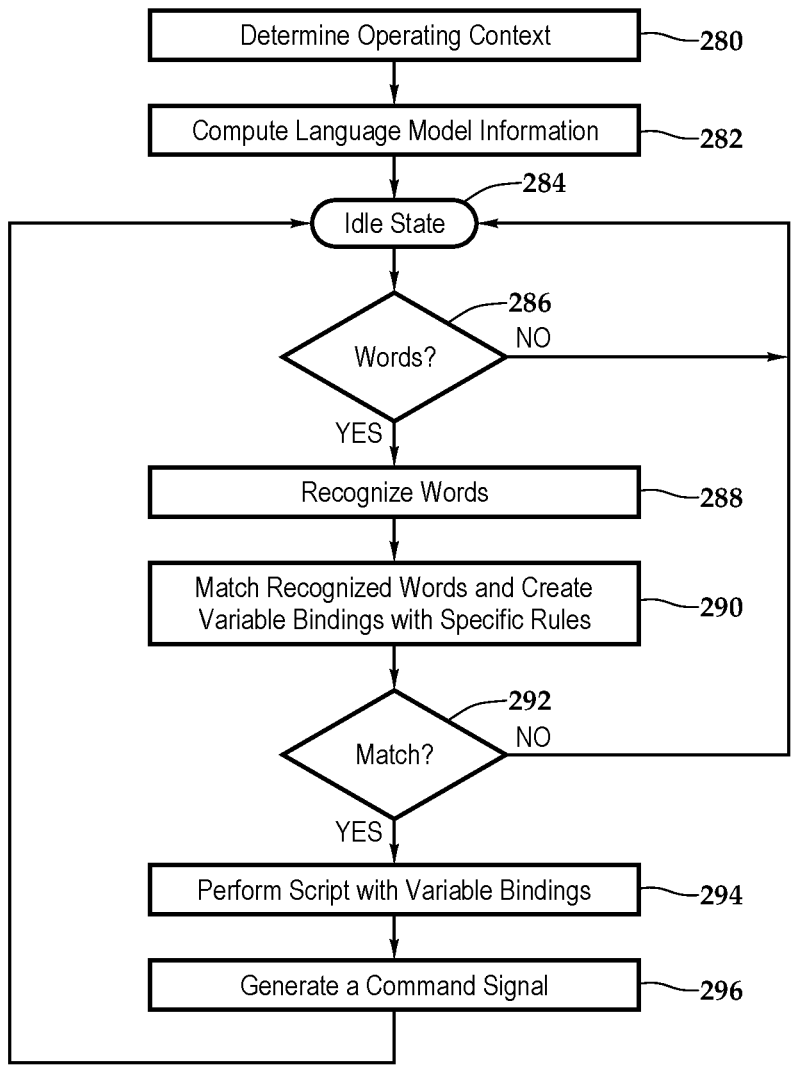
FIG. 6 is a flow chart depicting one embodiment of a process flow diagram illustrating a portion of the methodology of FIG. 5 in further detail.

Referring now to FIG. 6, one embodiment of a process flow diagram illustrating a portion of the methodology in further detail is depicted. More specifically, the methodology presented in FIG. 6 may relate to blocks 242, 244; 250, 252; and 258, 260 presented in FIG. 5. Continuing to refer to FIG. 6, at block 280, operating context is determined prior to language model information being computed at block 282. More specifically, with reference to blocks 280 and 282, a current operating context is determined by examining the instructions provided to the proximate wireless-enabled interactive programmable device. With this context, language model information is determined so that the scope of vocabulary search is defined such that in subsequent steps a determination may be made if any uttered speech matches. At block 284, the language recognition processing is in an idle state prior to obtaining words. As shown at decision block 286, the language recognition processing remains in an idle state (i.e., no "words") until words are detected.

At block 288, words are received and at block 290, speech rules which match the recognized utterance are determined. The process of matching a speech rule to an utterance also produces a set of variable bindings, which represents the meaning of various phrases in the recognized utterance. At decision block 292, the speech rules in the system are compared to the guest's utterance to determine if a match is present. If a match is not present, then the process returns to the idle state at block 284. On the other hand, if a match exists, then the process advances to block 294, where a script associated with the speech rules and the variable bindings from the previous steps is executed. The script may mimic the execution of a virtual button on the proximate wireless-enabled interactive programmable device, in one embodiment. The methodology then advances to block 296 where the corresponding command signal is generated.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box comprising:
a housing securing a television input, a television output, a processor, memory, and storage therein;
a busing architecture communicatively interconnecting the television input, the television output, the processor, the memory, and the storage;
a wireless transceiver associated with the housing and coupled to the busing architecture, the wireless transceiver operable to communicate with a proximate wireless-enabled interactive programmable device;
the television input configured to receive a source signal from an external source;
the television output configured to forward a fully tuned signal to a television;
the memory accessible to the processor, the memory including processor-executable instructions that, when executed, cause the processor to:
specify a search operation to identify the proximate wireless-enabled interactive device, wherein the search operation utilizes the wireless transceiver to wirelessly identify the proximate wireless-enabled interactive programmable device,
establish a pairing between the proximate wireless-enabled interactive programmable device and the set-top box,
send formatted parallel audiovisual experience instructions to the proximate wireless-enabled interactive programmable device, wherein the formatted parallel audiovisual experience instructions are configured to provide a downstream parallel experience related to the content on the television,
provide instructions for virtual buttons on a touch screen display associated with the proximate wireless-enabled interactive programmable device, the virtual buttons being associated with the proximate wireless-enabled interactive programmable device,
receive and process virtual remote control functionality input instructions from the proximate wireless-enabled interactive programmable device, the virtual remote control functionality input instructions being representations of a spoken sequence of words,
evaluating the spoken sequence of words to assign a meaning to the spoken sequence of words,
generate a command signal, and
send the command signal to the television; and
wherein the formatted parallel audiovisual experience instructions include instructions that prompt the spoken sequence of words as a response;
responsive to evaluating the spoken sequence of words, send a command to the particular amenity;
a configuration profile associated with the memory and processor-executable instructions that enables the set-top box to control a plurality of proximate amenities in a multi-room environment, the plurality of proximate amenities including the particular amenity, the plurality of proximate amenities being associated with a user's stay in a lodging environment;
the configuration profile, for each amenity of the plurality of amenities, including instructions for virtual buttons on a touch screen display, and instructions for associating virtual remote control functionality input instructions from the touch screen display with commands; and
the configuration profile, for each amenity of the plurality of amenities, including instructions for virtual buttons on a touch screen display, and instructions for associating virtual remote control functionality input instructions received as the spoken sequence of words from the proximate wireless-enabled interactive programmable device with commands.

2. The set-top box as recited in claim 1, wherein the housing further comprises a housing-dongle combination securing the television input, the television output, the processor, memory, storage, and wireless transceiver therewith.

3. The set-top box as recited in claim 2, wherein the processor and the memory are distributed through the housing-dongle combination.

4. The set-top box as recited in claim 1, wherein the wireless transceiver is configured to communicate with the wireless-enabled interactive programmable device via a standard selected from the group consisting of infrared (IR), 802.11, 3G, 4G, Edge, WiFi, ZigBee, near field communications (NFC), and Bluetooth.

5. The set-top box as recited in claim 1, wherein the wireless transceiver is configured to communicate with the wireless-enabled interactive programmable device via a short distance data exchange standard.

6. The set-top box as recited in claim 5, wherein the short distance data exchange standard comprises Bluetooth.

7. The set-top box as recited in claim 1, wherein the transceiver is at least partially internal to the housing.

8. The set-top box as recited in claim 1, wherein the transceiver is at least partially external to the housing.

9. The set-top box as recited in claim 1, wherein the transceiver comprises an antenna.

10. The set-top box as recited in claim 1, wherein the wireless-enabled interactive programmable device comprises a device selected from the group consisting of personal computers, laptops, tablet computers, smart phones, and smart watches.

11. The set-top box as recited in claim 1, wherein the command signal provides remote control of the television.

12. The set-top box as recited in claim 1, wherein the memory includes processor-executable instructions that, when executed cause the processor to:
responsive to evaluating the spoken sequence of words, import content from the proximate wireless-enabled interactive programmable device and reformat the imported content such that the television output forwards a fully tuned signal including the imported content to the television; and
wherein the fully tuned signal including the imported content provides an upstream parallel experience on the television related to the content on the proximate wireless-enabled interactive programmable device.

13. The set-top box as recited in claim 1, wherein the plurality of proximate amenities is selected from the group of amenities consisting of lights, thermostats, shades, and doorbell/do not disturb designations.

14. A set-top box comprising:
a housing securing a television input, a television output, a processor, memory, and storage therein;
a busing architecture communicatively interconnecting the television input, the television output, the processor, the memory, and the storage;
a wireless transceiver associated with the housing and coupled to the busing architecture, the wireless transceiver operable to communicate with a proximate wireless-enabled interactive programmable device;
the television input configured to receive a source signal from an external source;
the television output configured to forward a fully tuned signal to a television;
the memory accessible to the processor, the memory including processor-executable instructions that, when executed, cause the processor to:
specify a search operation to identify the proximate wireless-enabled interactive device, wherein the search operation utilizes the wireless transceiver to wirelessly identify the proximate wireless-enabled interactive programmable device,
establish a pairing between the proximate wireless-enabled interactive programmable device and the set-top box,
send formatted parallel audiovisual experience instructions to the proximate wireless-enabled interactive programmable device, wherein the formatted parallel audiovisual experience instructions are configured to provide a downstream parallel experience related to the content on the television,
provide instructions for virtual buttons on a touch screen display associated with the proximate wireless-enabled interactive programmable device, the virtual buttons being associated with the proximate wireless-enabled interactive programmable device,
receive and process virtual remote control functionality input instructions from the proximate wireless-enabled interactive programmable device, the virtual remote control functionality input instructions being representations of a spoken sequence of words,
evaluating the spoken sequence of words to assign a meaning to the spoken sequence of words,
responsive to evaluating the spoken sequence of words, import content from the proximate wireless-enabled interactive programmable device and reformat the imported content such that the television output forwards a fully tuned signal including the imported content to the television;
wherein the fully tuned signal including the imported content provides an upstream parallel experience on the television related to the content on the proximate wireless-enabled interactive programmable device; and
wherein the formatted parallel audiovisual experience instructions include instructions that prompt the spoken sequence of words as a response;
responsive to evaluating the spoken sequence of words, send a command to the particular amenity;
a configuration profile associated with the memory and processor-executable instructions that enables the set-top box to control a plurality of proximate amenities in a multi-room environment, the plurality of proximate amenities including the particular amenity, the plurality of proximate amenities being associated with a user's stay in a lodging environment;
the configuration profile, for each amenity of the plurality of amenities, including instructions for virtual buttons on a touch screen display, and instructions for associating virtual remote control functionality input instructions from the touch screen display with commands; and
the configuration profile, for each amenity of the plurality of amenities, including instructions for virtual buttons on a touch screen display, and instructions for associating virtual remote control functionality input instructions received as the spoken sequence of words from the proximate wireless-enabled interactive programmable device with commands.

15. The set-top box as recited in claim 14, wherein the housing further comprises a housing-dongle combination securing the television input, the television output, the processor, memory, storage, and wireless transceiver therewith.

16. The set-top box as recited in claim 14, wherein the wireless-enabled interactive programmable device comprises a device selected from the group consisting of personal computers, laptops, tablet computers, smart phones, and smart watches.

17. A set-top box comprising:
a housing securing a television input, a television output, a processor, memory, and storage therein;
a busing architecture communicatively interconnecting the television input, the television output, the processor, the memory, and the storage;

a wireless transceiver associated with the housing and coupled to the busing architecture, the wireless transceiver operable to communicate with a proximate wireless-enabled interactive programmable device;

the television input configured to receive a source signal from an external source;

the television output configured to forward a fully tuned signal to a television;

the memory accessible to the processor, the memory including processor-executable instructions that, when executed, cause the processor to:

specify a search operation to identify the proximate wireless-enabled interactive device, wherein the search operation utilizes the wireless transceiver to wirelessly identify the proximate wireless-enabled interactive programmable device, establish a pairing between the proximate wireless-enabled interactive programmable device and the set-top box, send formatted parallel audiovisual experience instructions to the proximate wireless-enabled interactive programmable device, wherein the formatted parallel audiovisual experience instructions are configured to provide a downstream parallel experience related to the content on the television, provide instructions for virtual buttons on a touch screen display associated with the proximate wireless-enabled interactive programmable device, the virtual buttons being associated with the proximate wireless-enabled interactive programmable device, receive and process virtual remote control functionality input instructions from the proximate wireless-enabled interactive programmable device, the virtual remote control functionality input instructions being representations of a spoken sequence of words, evaluating the spoken sequence of words to assign a meaning to the spoken sequence of words, responsive to evaluating the spoken sequence of words, send a command to the particular amenity;

a configuration profile associated with the memory and processor-executable instructions that enables the set-top box to control a plurality of proximate amenities in a multi-room environment, the plurality of proximate amenities including the particular amenity, the plurality of proximate amenities being associated with a user's stay in a lodging environment;

the configuration profile, for each amenity of the plurality of amenities, including instructions for virtual buttons on a touch screen display, and instructions for associating virtual remote control functionality input instructions from the touch screen display with commands;

the configuration profile, for each amenity of the plurality of amenities, including instructions for virtual buttons on a touch screen display, and instructions for associating virtual remote control functionality input instructions received as the spoken sequence of words from the proximate wireless-enabled interactive programmable device with commands; and wherein the formatted parallel audiovisual experience instructions include instructions that prompt the spoken sequence of words as a response.

18. The set-top box as recited in claim 17, wherein the housing further comprises a housing-dongle combination securing the television input, the television output, the processor, memory, storage, and wireless transceiver therewith.

19. The set-top box as recited in claim 17, wherein the wireless-enabled interactive programmable device comprises a device selected from the group consisting of personal computers, laptops, tablet computers, smart phones, and smart watches.

* * * * *